United States Patent Office
3,135,782
Patented June 2, 1964

3,135,782
HINDERED PHENYL BORATES
Irving S. Bengelsdorf, Santa Ana, and William G. Woods, Anaheim, Calif., assignors to United States Borax & Chemical Corporation, Los Angeles, Calif., a corporation of Nevada
No Drawing. Filed Dec. 5, 1962, Ser. No. 242,359
8 Claims. (Cl. 260—462)

This invention relates to hindered phenyl borates and, more particularly, it relates to novel hindered phenyl borates having dialkylaminoalkyl groups.

It is, therefore, an object of this invention to provide, as new compositions, certain novel hindered phenyl borates.

It is also an object of this invention to provide novel hindered phenyl borates having two dialkylaminoalkyl groups.

It is a further object of this invention to provide a process for producing said novel borates.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

There are provided by this invention novel compounds of the formula

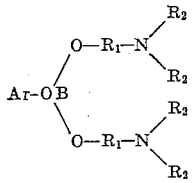

where Ar is a hindered phenyl radical having tertiary alkyl substituents in the 2 and 6 positions of the ring, $R_1$ is an alkylene radical having from 2 to 3 carbon atoms, and $R_2$ is a lower alkyl radical.

The hindered phenyl borates of the present invention are high-boiling compounds which have relatively good hydrolytic stability. They are useful as epoxy resin curing agents.

The moiety represented by Ar in the above formula comprises a hindered phenyl radical characterized by tertiary alkyl substituents in the 2 and 6 positions of the ring. The aromatic ring can also have substituents in any one or all of the remaining positions, which may be the same or different substituents, but it is essential that the 2 and 6 positions be substituted with tertiary alkyl groups. We prefer compounds in which Ar represents

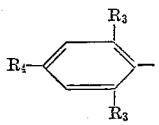

where $R_3$ is a tertiary alkyl radical such as tertiary-butyl and tertiary-amyl, and $R_4$ is selected from the group consisting of hydrogen and the lower alkyl radicals such as methyl, ethyl, tert.-butyl, tert.-amyl, and the like.

The alkylene radicals represented by $R_1$ in the above formula are those having 2 or 3 carbon atoms, straight or branched chain, such as ethylene, propylene and methylethylene. $R_2$ in the above formula represents a lower alkyl group such as methyl, ethyl, propyl, butyl, pentyl and octyl. The straight chain lower alkyls are preferred.

The compounds can be prepared by reaction of a hindered phenol with the corresponding tris(dialkylaminoalkyl)borate at elevated temperatures. Although a solvent can be used, the preferred procedure is to react the materials in the absence of a solvent so as to facilitate removal of the alcohol by-product. Substantially equimolar amounts of reactants are heated together at an elevated temperature sufficient to remove the alcohol by-product. The desired product is then isolated and purified by conventional procedures, such as by fractional distillation under reduced pressure.

A particularly useful procedure is to use a mixture of dialkylaminoalkanol and a tri-(lower alkyl)borate as the borate reactant for reaction with the phenol. Thus, by replacing a portion of the dialkylaminoalkyl groups of the tris(dialkylaminoalkyl)borate with a less expensive and more readily available lower alkyl group, the more easily removed lower alkanol is obtained as a byproduct. When the mixture is used, a preferred mole ratio of reactants is 2 moles of dialkylaminoalkanol:1 mole of tri-(lower alkyl)borate:1 mole of hindered phenol.

The following examples are presented to illustrate the preparation of typical examples of the compounds of this invention, but it is to be understood that the invention is not to be limited to the specific examples given.

EXAMPLE I

Bis(α-Methyl-β-Dimethylaminoethyl)-2,6-Di-Tert.-Butylphenylborate

A mixture of 37.6 grams (0.2 mole) of freshly distilled triisopropyl borate, 41.2 grams (0.4 mole) of β-dimethylaminoisopropanol and 41.2 grams (0.2 mole) of 2,6-di-tert.-butylphenol was heated under a Vigreux column and distillate slowly removed at 82° C. A total of 35.1 grams (97.3% of theory) of isopropanol was collected over a 5.25 hour period. The liquid residue was then distilled under reduced pressure through a short Vigreux column. After taking a forecut, the desired product was collected at 137°–156° C./0.4–0.6 mm.; $n_D^{25}$ 1.4745. A total of 39.4 grams was obtained. The product had the following elemental analysis.

Calculated for $C_{24}H_{45}BN_2O_3$: C, 68.56; H, 10.79; B, 2.57; N, 6.66. Found: C, 68.55; H, 10.89; B, 2.77; N, 6.59.

EXAMPLE II

Bis(β-Dimethylaminoethyl)-2,6-Di-Tert.-Butylphenylborate

To 100.1 grams of a mixture of tris(β-dimethylaminoethyl)borate and triisopropyl borate (2:1 ratio) was added 41.3 grams (0.2 mole) of 2,6-di-tert.-butylphenol and the resulting mixture stirred and heated at 325° C. for one hour. Distillate was then removed through an efficient column over a 5 hour period at 58°–47.5° C./260–170 mm. The distillate (9.67 grams) was identified as isopropyl alcohol. The residue was then distilled under reduced pressure through a short Vigreux column. After taking a forecut, the desired product was collected at 154°–143.5° C./0.52–0.10 mm.; $n_D^{25}$ 1.4838. A total of 50.6 grams (64.5%) was obtained. The product had the following analysis.

Calculated for $C_{22}H_{41}BN_2O_3$: C, 67.34; H, 10.53; B, 2.76; N, 7.14. Found: C, 67.08; H, 10.63; B, 2.88; N, 7.12.

EXAMPLE III

*Bis(β-Di-n-Butylaminoethyl)-2,6-Di-Tert.-Butyl-4-Methylphenylborate*

A mixture of 75.3 grams (0.4 mole) of triisopropyl borate, 88.2 grams (0.4 mole) of 2,6-di-tert.-butyl-4-methylphenol and 138.8 grams (0.8 mole) of β-di-n-butylaminoethanol in 150 ml. of toluene was stirred and boiled under a short Vigreux column. A toluene-isopropanol mixture (167 grams) was removed as the distillate at about 81° to 110° C. The residue was then heated at 100° C. in vacuo, removing the remaining solvent to give 236 grams of amber-colored oily product; $n_D^{24}$ 1.4707.

Analysis: N, 4.5% (theory=4.87%).

The following are among the many other compounds embraced by the present invention, and may be prepared according to the directions given above:

Bis(γ-dimethylaminopropyl)-2,6-tert.-butylphenylborate
Bis(β - diethylaminoethyl) - 2,4,6 - tri-tert.-butylphenylborate
Bis(β - di - n - pentylaminoethyl)-2,6-di-tert.-butylphenylborate
Bis(β - dimethylaminoethyl) - 2,6 - di-tert.-amylphenylborate
Bis(β - di - n - octylaminoethyl) - 2,6-di-tert.-butylphenylborate The following examples illustrate the use of a representative compound of this invention as an epoxy resin curing agent.

EXAMPLE IV

A mixture of 4.6 grams of bis(β-dimethylaminoethyl)-2,6-di-tert.-butylphenylborate and 35.1 grams of an epichorohydrinbisphenol-A epoxy resin precursor was heated in a mold at 120° C. After 30 minutes, the disc was dark and hard. Nineteen hours at 120° C. gave a dark, reddish-brown disc with a Barcol hardness of 30 and very good impact resistance.

EXAMPLE V

The procedure of Example IV was repeated except that 2.2 grams of the same borate was used. A hard, greenish-yellow disc was obtained after 1.75 hours at 120° C. After 46.5 hours at 120° C., the dark amber, clear disc had a Barcol hardness of 25 and good impact resistance.

Other modes of applying the principle of the invention may be employed, change being made as regards the details described, provided the features stated in any of the following claims or the equivalent of such be employed.

We, therefore, particularly point out and distinctly claim as our invention:

1. A compound of the formula

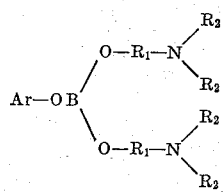

where Ar is a hindered phenyl radical having tertiary alkyl substituents in the 2 and 6 positions of the ring, $R_1$ is an alkylene radical of from 2 to 3 carbon atoms, and $R_2$ is a lower alkyl radical.

2. A compound of the formula

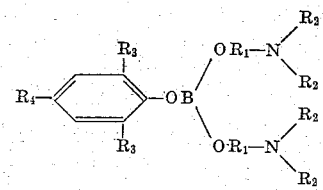

where $R_1$ is an alkylene radical of from 2 to 3 carbon atoms, $R_2$ is a lower alkyl radical, $R_3$ is a tertiary alkyl radical, and $R_4$ is selected from the group consisting of hydrogen and the lower alkyl radicals.

3. A compound according to claim 1 in which said $R_2$ is methyl.

4. A compound according to claim 2 in which said $R_3$ is tertiary butyl and $R_4$ is hydrogen.

5. Bis(β - dimethylaminoethyl) - 2,6 - di-tert.-butylphenylborate.

6. Bis(α - methyl - β - dimethylaminoethyl) - 2,6-di-tert.-butylphenylborate.

7. Bis(β - di - n - butylaminoethyl) - 2,6 - di-tert.-butyl-4-methylphenylborate.

8. The process for producing a bis(di-lower alkylaminoalkyl) hindered phenyl borate which comprises heating at an elevated temperature sufficient to remove lower alkanol by-product a mixture of di-(lower alkyl)aminoalkanol, tri-(lower alkyl) borate and hindered phenol in a mole ratio of 2:1:1, removing said lower alkanol by-product from the reaction mass, and isolating said bis(di-lower alkylaminoalkyl) hindered phenyl borate.

No references cited.